United States Patent [19]
Hidaka et al.

[11] Patent Number: 5,503,855
[45] Date of Patent: Apr. 2, 1996

[54] FREEZING-RESISTANT OIL-AND-FAT FEEDSTOCK, METHOD FOR PRODUCING SAID FEEDSTOCK AND FROZEN FOOD CONTAINING SAID FEEDSTOCK

[75] Inventors: Hiroshi Hidaka, Sakai; Tsugio Nishimoto, Naga; Tsugio Izumi, Sennan, all of Japan

[73] Assignee: Fuji Oil Company, Limited, Osaka, Japan

[21] Appl. No.: 266,655

[22] Filed: Jun. 28, 1994

Related U.S. Application Data

[63] Continuation-in-part of Ser. No. 82,298, Jun. 28, 1993, abandoned.

[30] Foreign Application Priority Data

Jun. 29, 1992 [JP] Japan ................... 4-196181

[51] Int. Cl.⁶ ........................................... A23D 7/00
[52] U.S. Cl. ................................. 426/33; 426/607
[58] Field of Search ........................... 426/607, 606, 426/33, 35

[56] References Cited

U.S. PATENT DOCUMENTS

| | | |
|---|---|---|
| 3,450,819 | 6/1969 | Babayan . |
| 4,247,471 | 1/1981 | Klein .................... 426/607 |
| 4,832,975 | 5/1989 | Yang .................... 426/607 |
| 5,000,975 | 3/1991 | Tomarelli ............... 426/602 |
| 5,066,510 | 11/1991 | Ehrman ................ 426/607 |
| 5,288,512 | 2/1994 | Serden ................. 426/607 |

FOREIGN PATENT DOCUMENTS

| | | |
|---|---|---|
| 0035883 | 9/1981 | European Pat. Off. . |
| 0305901 | 3/1989 | European Pat. Off. . |
| 0577371 | 1/1994 | European Pat. Off. . |
| WO89/09596 | 10/1989 | WIPO . |
| WO92/19237 | 11/1992 | WIPO . |

OTHER PUBLICATIONS

Database WPI, Week 9216, Derwent Publications Ltd., London, GB; AN 92–126432 & JP-A-4 066 052 (Ajinomoto KK) 2 Mar. 1992.

Database WPI, Week 8644, Derwent Publications Ltd., London, GB; AN 86–287696 & JP-A-61 209 544 (Ueda Seiyu KK) 17 Sep. 1986.

*Primary Examiner*—Carolyn Paden
*Attorney, Agent, or Firm*—Wenderoth, Lind & Ponack

[57] ABSTRACT

There is disclosed a freezing-resistant oil-and-fat feedstock which is obtained by selective rearrangement with middle-chain saturated fatty acid residues at the 1st and 3rd positions of triglycerides and has a melting point of $-18°$ C. or lower as measured by differential scanning calorimetry (DSC). The oil-and-fat feedstock is composed of mixed fatty acid triglycerides ($U_2M$ and $UM_2$) at an mount of 10% by weight or more, based on the total weight of the feedstock, the fatty acid triglycerides consisting of unsaturated fatty acid residues (U) and middle-chain saturated fatty acid residues (M) and the ratio of $U_2M$ to $UM_2$ being ⅓ or higher. Also disclosed are methods for producing the freezing-resistant oil-and-fat feedstock and various kinds of frozen food utilizing the freezing-resistant oil-and-fat feedstock.

5 Claims, No Drawings

FREEZING-RESISTANT OIL-AND-FAT FEEDSTOCK, METHOD FOR PRODUCING SAID FEEDSTOCK AND FROZEN FOOD CONTAINING SAID FEEDSTOCK

CROSS-REFERENCE TO RELATED APPLICATION

The present application is a continuation-in-part application of U.S. Ser. No. 08/082,298 filed on Jun. 28, 1993, now abandoned.

FIELD OF THE INVENTION

The present invention relates to a freezing-resistant oil-and-fat feedstock which is suitable for use in oil-and-fat ingredient-containing food, such as mayonnaise, dressing, frozen dessert, frozen dough and margarine. It also relates to a method for producing the freezing-resistant oil-and-fat feedstock and to various kinds of frozen food containing the freezing-resistant oil-and-fat feedstock.

BACKGROUND OF THE INVENTION

The freezing temperature (i.e., melting point) of oil-and-fat feedstocks may vary over a significantly wide range, which results in a distribution of them in the state of from solid to liquid at ordinary temperatures, depending upon their composition. In general, oil-and-fat feedstocks partially crystallize at refrigerator temperatures (of from room temperature to about 0° C.) to cause clouding or turbidity, and totally solidify at freezer temperatures (of lower than 0° C., typically about –20° C.). When emulsified food containing an ordinary liquid fatty oil, such as dressing and mayonnaise, is allowed to freeze and thaw, its emulsification state is broken, thereby causing the separation of an oil phase. Therefore, emulsified food such as mayonnaise is not used as a food material to be separately enclosed within the main package of frozen food such as frozen fries with batter. For the stone reason, it is difficult to produce custard cream and custard cream-containing food as frozen food.

So far as the present inventors know, no attempt has hitherto been known to improve the freezing resistance of oil-and-fat feedstocks.

As an oil-and-fat feedstock for enteral nutrient of patients suffering from hepatopathy or the like, there have hitherto been known SUS-type (1,3-disaturated-2-unsaturated) triglycerides having middle-chain fatty acid residues of 8 to 12 carbon atoms at the 1st and 3rd positions thereof and a long-chain unsaturated fatty acid residue with two or more unsaturated groups at the 2nd position thereof (see, e.g., JP-A 63-297342). It is also described that the oil-and-fat feedstock can be utilized in mayonnaise, dressing and the like because it is in liquid state at ordinary temperatures, although it is unknown whether this oil-and-fat feedstock can be used as a freezing-resistant oil-and-fat material (see also JP-A 63-297342). Further, it is disclosed that another SUS-type triglyceride, 1,3-didecanoyl-2-Canola glyceride is useful as an oil-and-fat feedstock for enteral or parenteral nutrient (see, e.g., JP-A 4-500971 ).

These conventional feedstocks are, however, unsatisfactory as a general-purpose edible oil-and-fat feedstock from an economical point of view because they are products with high purity for pharmaceutical use and many efforts are required for their purification.

It is well known that the melting point of oil-and-fat feedstocks has a tendency to increase with an increase in the chain length of their substituent fatty acid residues or in the degree of saturation. It is, however, difficult to predict the melting point of complex mixed fatty acid triglycerides. For example, even in case of trilinolenin (linolenic acid triglyceride) which is ordinarily supposed to have a low melting point, its melting point is merely –23° C. Moreover, oil-and-fat feedstocks have a property of polymorphism; for example, triolein can take different forms, such as β-form (m.p., 4.9° C.), β'-form (m.p., –12° C.) and α-form (m.p., –32° C.), so that it may cause crystal deposition even at relatively high temperatures such as about refrigerator temperatures.

OBJECTS OF THE INVENTION

Under these circumstances, the present inventors have intensively made various studies for the purpose of conferring stable freezing resistance to edible oil-and-fat feedstocks. As the result, they have found that the freezing resistance of oil-and-fat feedstocks can be improved by increasing, to a certain extent or more, the amount of mixed fatty acid triglycerides ($U_2M$ and $UM_2$) consisting of unsaturated fatty acid residues (U) and middle-chain saturated fatty acid residues (M) in the oil-and-fat feedstocks, and also by increasing the ratio of $U_2M$ to $UM_2$ to a certain extent or higher, thereby completing the present invention.

That is, the main object of the present invention is to provide a freezing-resistant oil-and-fat feedstock which is suitable for improving the freezing resistance of oil-and-fat ingredient-containing food such as salad oil, dressing, mayonnaise, frozen dessert (e.g., ice cream), frozen dough and margarine.

Another object of the present invention is to provide a method for producing a freezing-resistant oil-and-fat feedstock as described above.

Still another object of the present invention is to provide various kinds of frozen food utilizing a freezing-resistant oil-and-fat feedstock as described above, such as salad oil, dressing, mayonnaise, frozen dessert (e.g., ice cream), frozen dough and margarine.

These objects as well as other objects and advantages of the present invention will become apparent to those skilled in the art from the following description.

SUMMARY OF THE INVENTION

According to the present invention, there is provided a freezing-resistant oil-and-fat feedstock which is obtained by selective rearrangement with middle-chain saturated fatty acid residues at the 1st and 3rd positions of triglycerides and has a melting point of –18° C. or lower as measured by differential scanning calorimetry (DSC), comprising mixed fatty acid triglycerides ($U_2M$ and $UM_2$) at an amount of 10% by weight or more, based on the total weight of the feedstock, the mixed fatty acid triglycerides consisting of unsaturated fatty acid residues (U) and middle-chain saturated fatty acid residues (M) and the ratio of $U_2M$ to $UM_2$ being ⅓ or higher. The freezing-resistant oil-and-fat feedstock is suitable for improving the freezing resistance of oil-and-fat ingredient-containing food such as salad oil, dressing, mayonnaise, frozen dessert (e.g., ice cream), frozen dough and margarine.

In another aspect, the present invention provides a method for producing a freezing-resistant oil-and-fat feedstock, comprising: (1) introducing middle-chain fatty acid residues (M) by ester interchange using a specific kind of lipase having selective reactivity with fatty acid residues at the 1st and 3rd positions of triglycerides into a fatty oil which is in liquid state at ordinary temperatures or (2) mixing a freezing-resistant oil-and-fat feedstock as described above with a fatty oil which is in liquid state at ordinary temperatures, so that the total amount of mixed fatty acid triglycerides ($U_2M$ and $UM_2$) becomes 10% by weight or more, based on the total weight of the feedstock, and the ratio of $U_2M$ to $UM_2$ becomes 1/3 or higher.

In still another aspect, the present invention provides various kinds of frozen food comprising a substantial amount of a freezing-resistant oil-and-fat feedstock as described above, such as salad oil, dressing, mayonnaise, frozen dessert (e.g., ice cream), frozen dough and margarine.

DETAILED DESCRIPTION OF THE INVENTION

The freezing-resistant oil-and-fat feedstock of the present invention is obtained by selective rearrangement with middle-chain saturated fatty acid residues at the 1st and 3rd positions of triglycerides and has a melting point of −18° C. or lower as measured by differential scanning calorimetry (DSC). The oil-and-fat feedstock comprises mixed fatty acid triglycerides ($U_2M$ and $UM_2$) at an amount of 10% by weight or more, based on the total weight of the feedstock, the mixed fatty acid triglycerides consisting of unsaturated fatty acid residues (U) and middle-chain saturated fatty acid residues (M) and the ratio of $U_2M$ to $UM_2$ being 1/3 or higher.

As used herein, the term "oil-and-fat" refers to a substance composed mainly of triglycerides which are triesters of glycerol with fatty acids. In general, oil-and-fat ingredients are classified into fatty oils which are in liquid state at ordinary temperatures and fats which are in solid state at ordinary temperatures.

The unsaturated fatty acid residues may preferably contain 16 to 24 carbon atoms, typical examples of which are linolenic acid and linolenic acid, both having 18 carbon atoms.

As used herein, the term "middle-chain fatty acid" refers to a straight-chain saturated fatty acid of 4 to 10 carbon atoms, preferably 4 to 8 carbon atoms.

If the total amount of $U_2M$ and $UM_2$ is less than 10% by weight, desired low-melting oil-and-fat feedstocks (triglyceride compositions) cannot be obtained. Also, if the amount of $UM_2$ in the mixed fatty acid glycerides is increased and therefore the ratio of $U_2M$ to $UM_2$ becomes less than 1/3, the oil-and-fat feedstock obtained has a tendency to readily solidify at the time of freezing, thereby making it impossible to attain the purpose of the present invention.

The freezing-resistant oil-and-fat feedstock of the present invention may further comprise mixed fatty acid triglycerides ($U_2S$, $US_2$ and $S_3$) consisting of fatty acid residues selected from the group consisting of unsaturated fatty acid residues (U) and long-chain saturated fatty acid residues (S) of 12 or more carbon atoms.

The amount of long-chain saturated fatty acid residues (S) of 12 or more carbon atoms in the oil-and-fat feedstock of the present invention may be defined according to the fatty acid composition of the oil-and-fat ingredient raw material. In general, it is desirable that the total amount of $S_2U$ and $S_3$ is 10% by weight or less and the amount of $SU_2$ is 30% by weight or less, both based on the total weight of the feedstock. When any liquid fatty oil is used as an oil-and-fat ingredient raw material, these conditions are both satisfied inevitably because liquid fatty oils contain little amount of long-chain saturated fatty acids.

The oil-and-fat feedstock of the present invention has a freezing resistance at temperatures of −20° C. or lower. Utilizing this property, the freezing resistance of oil-and-fat ingredient-containing food such as salad oil, dressing, mayonnaise, frozen dessert (e.g., ice cream), frozen dough and margarine can be significantly improved, which makes it possible to process or use the food of this kind at low temperatures of about refrigerator temperatures or lower.

It is ordinarily expected that the melting point of the oil-and-fat feedstock of the present invention will be decreased with an increase in the amount of triunsaturated triglycerides in the oil-and-fat feedstock. Even if a large amount of triunsaturated fatty acid triglycerides ($U_3$) are used together with $M_2U$-type triglycerides of 4 to 10 carbon atoms as described above, however, the melting point of the oil-and-fat feedstock obtained is not decreased as expected, but rather it is not substantially different from the melting point of the oil-and-fat feedstock in which a relatively large amount of $MU_2$-type triglycerides of 4 to 10 carbon atoms are mixed with $M_2U$-type triglycerides as described above. On the other hand, the oxidation-resistance stability of the oil-and-fat feedstock is reduced with an increase in the amount of unsaturated fatty acid residues, and it is, therefore, desirable from a practical point of view that the oil-and-fat feedstock is produced to have a decreased melting point under the conditions that the amount of triunsaturated fatty acid triglycerides is decreased to be as small as possible. As shown in Example 2 below, in case where the ratio of $U_2M$ to $UM_2$ (wherein the middle-chain saturated fatty acid residue (M) has 6 carbon atoms) is about 1/1.4, the melting point of the oil-and-fat feedstock is decreased down to −33.5° C.

The freezing-resistant oil-and-fat feedstock of the present invention can be produced by ester interchange of a fatty oil having a low amount of saturated fatty acid residues (i.e., fatty oil in liquid state at ordinary temperatures) with a free fatty acid of 4 to 10 carbon atoms or its ester with a monohydric, dihydric or trihydric lower alcohol. Examples of the fatty oil are safflower oil, high-oleic safflower oil, sunflower oil, high-oleic sunflower oil, rapeseed oil, mustard seed oil, cotton seed oil, olive oil and soybean oil. Examples of the free fatty acid are butyric acid, capric acid and caprylic acid. Examples of the fatty acid ester are ethyl caprate, tributyrin and tricaprylin.

As used herein, the term "ordinary temperatures" refers to a temperature range of from 15° C. to 25° C. according to the Japanese Industrial Standard (JIS). The term "room temperature" is interchangeably used with the term "ordinary temperatures" in the context of this specification.

The ester interchange can be selectively conducted by an enzyme method. For example, a certain kind of lipase having selective reactivity with fatty acid residues at the 1st and 3rd positions of triglycerides, such as Lipozyme (Novo), Talipase (Tanabe Seiyaku), Lipase D, Lipase AP or Lipase M-AP (latter three are available from Amano), is preferably attached to an appropriate solid support such as polysaccharide derivatives, polyacrylamide gel, polystyrene, porous glass, silica gel or alumina. With the use of such an immobilized enzyme, the fatty oil is subjected to ester interchange with a free fatty acid or its ester as a donor.

If desired, an ordinary post-treatment such as alkali washing, steam distillation, polymer membrane treatment, ionic resin treatment or solvent fractionation may be employed for purification of the ester interchange product. In many cases, however, the production without employing such a particular purification technique is usually better for the purpose of obtaining a low-melting oil-and-fat feedstock. In particular, when a certain triglyceride is used as a donor, the desired low-melting oil-and-fat feedstock can be obtained only with separation of a catalyst from the reaction mixture by a conventional method.

The freezing-resistant oil-and-fat feedstock of the present invention has an extremely low melting point, so that it dose not solidify even at low temperatures such as about freezer temperatures. Therefore, even if a certain kind of oil-and-fat ingredient-containing food such as salad oil, dressing, mayonnaise, frozen dessert (e.g., ice cream), frozen dough or margarine, which has been prepared using this feedstock as all or some of the oil-and-fat ingredients, is stored in frozen state, there is no occurrence of any defect such as turbidity, roughening, oil phase separation and cracking. In addition, the oil-and-fat feedstock of the present invention has an excellent emulsifiability because it contains some amounts of middle-chain fatty acid residues, which results in an advantage that any emulsified food such as cream, mayonnaise and dressing has little tendency to cause oil phase separation even if stored at low temperatures such as below −18° C.

The present invention is further illustrated by way of the following examples and comparative examples, which are not to be construed to limit the scope thereof.

Examples 1–7 and Comparative Example 1

According to the formulations as shown in Table 1 below, various oil-and-fat feedstocks were produced by subjecting the respective oil-and-fat ingredient raw material and donor to ester interchange using a particular kind of lipase having selective reactivity with fatty acid residues at the 1st and 3rd positions of triglycerides according to a conventional method. The type and mount of triglycerides contained in the oil-and-fat feedstock and the melting point (°C.) as measured by differential scanning calorimetry (DSC) are also shown in Table 1.

Example 8

The oil-and-fat feedstock of Example 1 was mixed with safflower oil at various ratios as shown in Table 2 below, resulting in various freezing-resistant oil-and-fat feedstocks. The melting point (°C.) and peak area ratio (%) as determined by differential scanning calorimetry (DSC) are also shown in Table 2.

TABLE 1

| | Raw materials | | Composition | | |
|---|---|---|---|---|---|
| Example No. | Kind | Amount (grams) | Type [1] | Amount (wt %)[2] | m.p. (°C.)[3] |
| Example 1 | Safflower oil | 200 | $C_8$—U—$C_8$ | 61 | −21 |
| | Ethyl octanoate | 400 | $C_8$—U—U | 26 | |
| | | | U—U—U | 2.4 | |
| Comp. Example 1 | Safflower oil | 100 | $C_8$—U—$C_8$ | 72 | −16 |
| | Ethyl octanoate | 400 | $C_8$—U—U | 18 | |
| | | | U—U—U | 2.0 | |
| Example 2 | Safflower oil | 200 | $C_6$—U—$C_6$ | 50 | −33.5 |
| | Ethyl hexanoate | 330 | $C_6$—U—U | 36.1 | |
| | | | U—U—U | 3.8 | |
| Example 3 | High-oleic safflower oil | 200 | $C_6$—U—$C_6$ | 53 | −28.0 |
| | Ethyl hexanoate | 330 | $C_6$—U—U | 34 | |
| | | | U—U—U | 3.9 | |
| Example 4 | Safflower oil | 280 | $C_8$—U—$C_8$ | 6.3 | −26.0 |
| | Tricaprylin | 20 | $C_8$—U—U | 30.8 | |
| | | | U—U—U | 42.8 | |
| Example 5 | Sunflower oil | 190 | U—U—U | 54.4 | −34.0 |
| | Tributyrin | 10 | $C_4$—U—U | 19.9 | |
| | | | $C_4$—U—$C_4$ | 1.9 | |
| Example 6 | High-oleic sunflower oil | 200 | $C_8$—U—$C_8$ | 58.2 | −26.0 |
| | Ethyl octanoate | 400 | $C_8$—U—U | 27.7 | |
| | | | U—U—U | 2.9 | |
| Example 7 | Soybean oil | 285 | $C_8$—U—$C_8$ | 1.2 | −23.0 |
| | Tricaprylin | 15 | $C_8$—U—U | 16.0 | |
| | | | U—U—U | 42.3 | |

[1] For example, $C_8$—U—$C_8$ denotes a mixed fatty acid triglyceride having saturated fatty acid residues of 8 carbon atoms at the 1st and 3rd positions thereof and an unsaturated fatty acid residue at the 2nd position thereof.
[2] Percent by weight.
[3] Melting Point of the oil-and-fat feedstock as measured by DSC in which an oil-and-fat feedstock sample was held at −60° C. for 5 minutes to solidify and then temperature was gradually raised at a rate of 5° C./min. This melting point means the highest melting point selected from among the significant peaks, exclusive of quite small peaks, on the DSC curve.

TABLE 2

| Ingredient | Mixing ratio (wt %)[1] | | | | | | | |
|---|---|---|---|---|---|---|---|---|
| Oil-and-fat feedstock of Example 1 | 100 | 70 | 50 | 30 | 20 | 10 | 5 | 0 |
| Safflower oil | 0 | 30 | 50 | 70 | 80 | 90 | 95 | 100 |
| m.p. (°C.)[2] | | | | | | | | |
| High | | | | | | −14.3 | −14.2 | −14.0 |
| Low | −20.9 | −22.2 | −24.4 | −24.3 | −24.3 | −24.2 | −24.2 | |
| Peak area ratio (%)[3] | | | | | | | | |
| $C_8$—U—$C_8$ | 61 | | | | 12 | 6 | 3 | 0 |
| $C_8$—U—U | 26 | | | | 5 | 3 | 1.4 | 0 |

[1] Percent by weight.
[2] High and low peaks corresponding to the melting point of the oil-and-fat feedstock observed in the measurement by DSC.
[3] For example, $C_8$—U—U denotes a mixed fatty acid triglyceride having a saturated fatty acid residues of 8 carbon atoms at the 1st position thereof and unsaturated fatty acid residues at the 2nd and 3rd positions thereof.

Example 9 (Application Example 1)

According to the following formulation, various mayonnaise preparations were produced by a conventional method.

| Ingredient | wt % |
|---|---|
| Oil | 70 |
| Egg yolk | 16 |
| Vinegar | 12 |
| Salt | 2 |

As the oil ingredient, soybean oil, rapeseed oil, safflower oil or each of the oil-and-fat feedstocks of Example 4 and 7 (Example 4: safflower oil/$C_8$ triglycerides; Example 7: soybean oil/$C_8$ triglycerides) was used.

The mayonnaise preparations were respectively taken in 10 g portions into separate hexagonal vessels, and stored at temperatures of −20° C. or −25° C. for a predetermined period of from several days to 3 months, after which these mayonnaise preparations were thawed at a room temperature of 20° C. and observed for their emulsion state after the thawing. The results are shown in Table 3 below.

| Ingredient | wt % |
|---|---|
| Oil | 35.0 |
| Water | 36.7 |
| Vinegar | 19.0 |
| Thickening polysaccharide | 0.3 |
| Salt | 3.0 |
| Egg | 3.0 |
| Fructose and liquid glucose | 4.0 |

As the oil ingredient, soybean oil, rapeseed oil or each of the oil-and-fat feedstocks of Example 2 and 5 (Example 2: safflower oil/$C_6$ triglycerides; Example 5: sunflower oil/$C_4$ triglycerides) was used.

The dressing preparations were respectively taken in 10 g portions into separate hexagonal vessels, and stored at temperatures of −20° C. or −25° C. for a predetermined period of from several days to 1 month, after which these dressing preparations were thawed at a room temperature of 20° C. and observed for their emulsion state after the thawing. The results are shown in Table 4 below.

TABLE 3

| Oil-and-fat ingredient raw material | Storage Period and temperature (°C.) | | | | | | | |
|---|---|---|---|---|---|---|---|---|
| | 3 days | | 10 days | | 1 month | | 3 months | |
| | −20 | −25 | −20 | −25 | −20 | −25 | −20 | −25 |
| Soybean oil | X | X | XX | XX | XX | XX | XX | XX |
| Rapeseed oil | XX | XX | XX | XX | XX | XX | XX | XX |
| Safflower oil | O | O | X | XX | XX | XX | XX | XX |
| Oil-and-fat feedstock of Example 4 | O | O | O | O | O | O | O | O |
| Oil-and-fat feedstock of Example 7 | O | O | O | O | O | O | O | O |

Evaluation: O, good; X, slightly oil phase separated; and XX, completely oil phase separated.

As can be seen from Table 3, the oil-and-fat feedstocks of Examples 4 and 7 conferred freezing resistance to the mayonnaise preparations produced therefrom.

Example 10 (Application Example 2)

According to the following formulation, various French dressing preparations (emulsion type) were produced by a conventional method.

TABLE 4

| Oil-and-fat ingredient | Storage period and temperature (°C.) | | | |
|---|---|---|---|---|
| | 5 days | | 1 month | |
| raw material | −20 | −25 | −20 | −25 |
| Soybean oil | XX | XX | XX | XX |
| Rapeseed oil | XX | XX | XX | XX |
| Oil-and-fat feedstock of Example 2 | O | O | O | O |
| Oil-and-fat feedstock of Example 5 | O | O | O | O |

Evaluation: O, good; X, slightly oil phase separated; and XX, completely oil phase separated.

As can be seen from Table 4, the oil-and-fat feedstocks of Examples 2 and 5 conferred freezing resistance to the dressing preparations produced therefrom.

What is claimed is:

1. A method for producing a freezing-resistant oil-and-fat feedstock, comprising introducing middle-chain fatty acid residues (M), by ester interchange using a specific kind of lipase having selective reactivity with fatty acid residues at the 1st and 3rd positions of triglycerides, into a fatty oil which is in liquid state at ordinary temperatures, so that the total mount of mixed fatty acid triglycerides ($U_2M$ and $UM_2$) consisting of unsaturated fatty acid residues (U) and middle-chain saturated fatty acid residues (M) becomes 10% by weight or more, based on the total weight of the feedstock, and the ratio of $U_2M$ to $UM_2$ becomes ⅓ or higher.

2. A method according to claim 1, wherein said fatty oil is selected from the group consisting of safflower oil, high-oleic safflower oil, sunflower oil, high-oleic sunflower oil, rapeseed oil, mustard seed oil, cotton seed oil, olive oil and soybean oil.

3. A method according to claim 1, wherein said fatty oil is subjected to ester interchange with a free fatty acid or its ester selected from the group consisting of butyric acid, capric acid, caprylic acid, ethyl caprate, tributyrin and tricaprylin.

4. A method for producing a freezing-resistant oil-and-fat feedstock, comprising mixing with a fatty oil which is in liquid state at ordinary temperatures, a freezing-resistant oil-and-fat feedstock which is obtained by selective rearrangement with middle-chain saturated fatty acid residues at the 1st and 3rd positions of triglycerides and has a melting point of −18° C. or lower as measured by differential scanning calorimetry (DSC), said oil-and-fat feedstock comprising mixed fatty acid triglycerides ($U_2M$ and $UM_2$) at an amount of 10% by weight or more, based on the total weight of the feedstock, said mixed fatty acid triglycerides consisting of unsaturated fatty acid residues (U) and middle-chain saturated fatty acid residues (M) and the ratio of $U_2M$ to $UM_2$ being ⅓ or higher.

5. A method according to claim 4, wherein said fatty oil is selected from the group consisting of safflower oil, high-oleic safflower oil, sunflower oil, high-oleic sunflower oil, rapeseed oil, mustard seed oil, cotton seed oil, olive oil and soybean oil.

* * * * *